United States Patent
Lautzenhiser et al.

(10) Patent No.: US 6,874,378 B2
(45) Date of Patent: Apr. 5, 2005

(54) PRESSURE TRANSDUCER

(75) Inventors: Frans P. Lautzenhiser, Collegeville, PA (US); Anthony J. Stankavich, Kokomo, IN (US); John D Myers, Kokomo, IN (US); Terrence Evans, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 45 days.

(21) Appl. No.: 10/604,548

(22) Filed: Jul. 30, 2003

(65) Prior Publication Data

US 2005/0022616 A1 Feb. 3, 2005

(51) Int. Cl.[7] .............................................. G01L 1/04
(52) U.S. Cl. ...................... 73/862.627; 73/862; 117/211
(58) Field of Search ............. 73/862, 862.21–862.639, 73/763; 117/211; 338/2–6

(56) References Cited

U.S. PATENT DOCUMENTS

| 5,612,876 A | * | 3/1997 | Zeidler et al. ................. 701/45 |
| 5,744,727 A | | 4/1998 | Hanneborg et al. ............ 73/733 |
| 5,780,746 A | * | 7/1998 | Brady .......................... 73/763 |
| 5,918,696 A | * | 7/1999 | VanVoorhies ................ 180/273 |
| 5,982,047 A | | 11/1999 | Probst et al. ................. 307/9.1 |
| 5,986,221 A | * | 11/1999 | Stanley ........................ 177/136 |
| 6,032,536 A | * | 3/2000 | Peeters et al. ................. 73/725 |
| 6,236,301 B1 | * | 5/2001 | Langford et al. .............. 338/6 |
| 2002/0104369 A1 | | 8/2002 | Baker et al. ............... 73/31.06 |
| 2003/0060957 A1 | * | 3/2003 | Okamura et al. ............. 701/45 |

* cited by examiner

Primary Examiner—Edward Lefkowitz
Assistant Examiner—Alandra Ellington
(74) Attorney, Agent, or Firm—Stefan V. Chmielewski

(57) ABSTRACT

A pressure transducer suitable for use as a component of a passive occupant detection system installed in a passenger vehicle. The transducer comprises first and second contact members separated by a spacing member. The first contact member has on a surface thereof a primary contact comprising first and second terminations and portions spaced apart in a first direction. The second contact member has on a surface thereof a plurality of secondary contacts crossing and facing the spaced-apart portions of the primary contact through an opening in the spacing member. Application of an increasing force causes the contact members to move toward each other, causing an increasing number of the spaced-apart portions to be shorted out by the secondary contacts and causing an increasing number of secondary contacts to contact the primary contact, thereby altering the electrical path between the terminations of the primary contact.

20 Claims, 3 Drawing Sheets

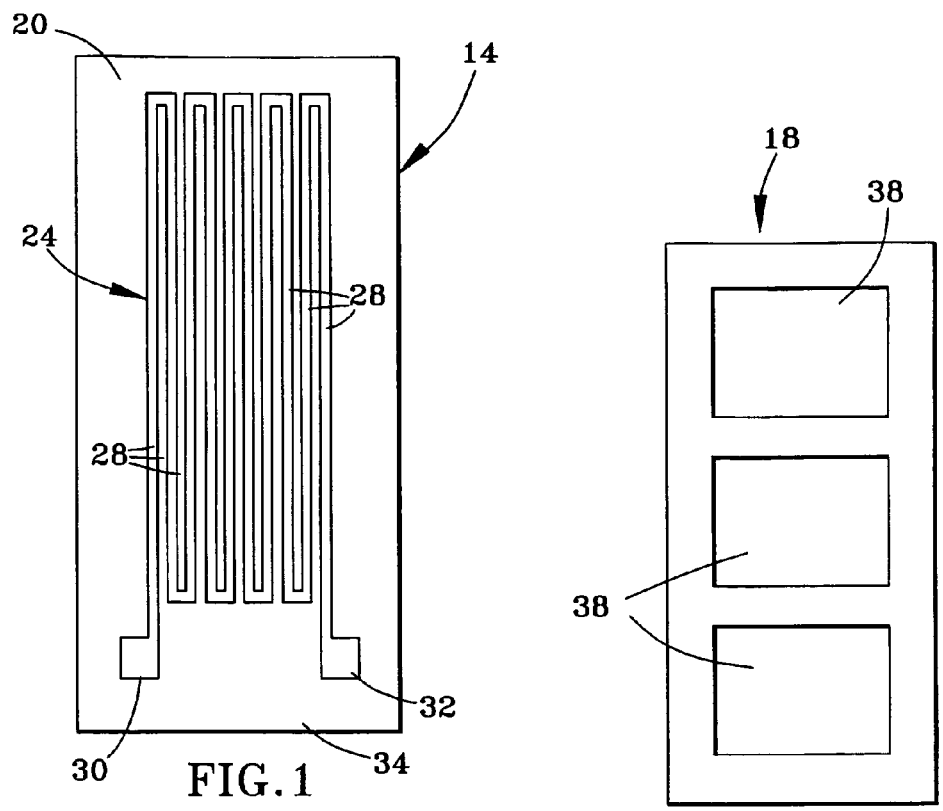
FIG.1
FIG.2
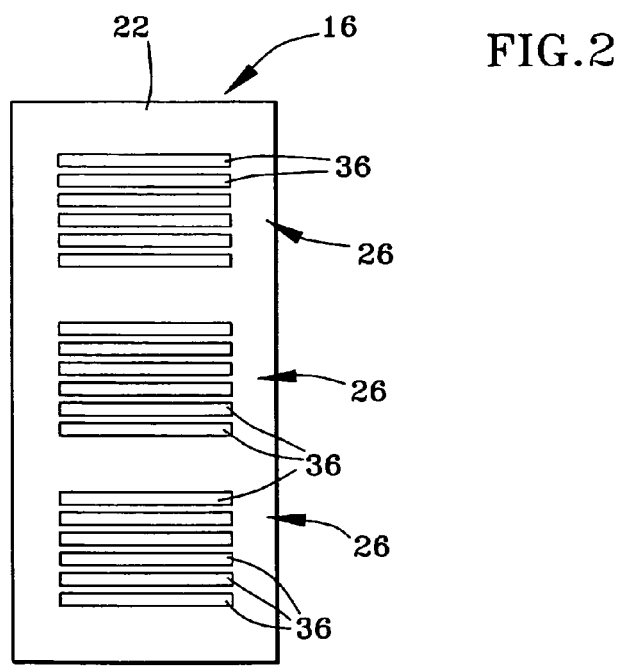
FIG.3

PRESSURE TRANSDUCER

BACKGROUND OF INVENTION

1. Field of the Invention

The present invention generally relates to electrical sensing devices. More particularly, this invention relates to a pressure transducer suitable for use in automotive applications, such as a switch sensor for a passive occupant detection system (PODS).

2. Description of the Related Art

PODS is a weight-based system for arming and disarming automotive passive restraint systems (e.g., air bags) in passenger vehicles to enable such systems to be effective for a range of occupant weights. Pressure or displacement transducers may be located in the passenger seat cushion and back for indicating if a seat is occupied and the weight of the occupant, e.g., an adult versus a child. Based on predetermined criteria, sensor output is used to control whether an air bag will deploy or not in the event of the need for occupant restraint. PODS may be integrated with other sensing systems, such as ultrasonic sensors that provide additional information regarding the position of a passenger in a seat.

Various types of pressure sensors are known, including micromachined single-crystal silicon pressure transducer cells manufactured using semiconductor fabrication processes. However, because of the brittle nature of the silicon materials, silicon sensors have found limited use for sensing force and displacement suitable for PODS applications. Other force and displacement-sensing transducers have been proposed, including those that make use of more rugged metal diaphragms, electrostatic or capacitive sensing structures, magnetic or ultrasonic measurement techniques, and compressible conductive gels. However, there remains a need for sensors that can be readily mass produced yet are capable of the high reliability and sensitivity required for PODS and other pressure-sensing applications.

SUMMARY OF INVENTION

The present invention is directed to a pressure transducer suitable for use as a component of a passive occupant detection system installed in a passenger vehicle, such as of a type that can be installed in a passenger seat cushion to determine a seat occupant's weight. The transducer generally comprises first and second contact members separated by a spacing member. The first contact member has on a surface thereof first and second terminations with a continuous electrical path defined therebetween by a primary contact. The primary contact has a plurality of portions spaced apart in a first direction of the transducer. The spacing member faces the surface of the first contact member and has at least one opening aligned with the spaced-apart portions of the primary contact. The second contact member has on a surface thereof a plurality of secondary contacts that face the spaced-apart portions of the primary contact through the one or more openings in the spacing member. The secondary contacts are oriented so as to cross multiple spaced-apart portions of the primary contact. More preferably, the secondary contacts are electrically separated and oriented parallel to each other and to the first direction of the transducer.

As a result of the above configuration of the transducer, an increasing force applied to cause the first and second contact members to move toward each other causes an increasing number of the spaced-apart portions of the primary contact to be shorted out by the secondary contacts. Such an increasing force also causes an increasing number of secondary contacts to contact the primary contact. In this manner, the length of the electrical path between the first and second terminations is altered, such that an electrical property of the transducer is altered. For example, if either or both of the primary and secondary contacts are formed of an electrically resistive material, the electrical resistance of the current path between the first and second terminations of the primary contact decreases as more of the secondary contacts come into contact with the spaced-apart portions of the primary contact. Shorting between the spaced-apart portions of the continuous primary contact causes a larger and more linear change in electrical resistance than would shorting between adjacent parallel secondary contacts. The spacing member is preferably configured so that contact between the primary and secondary contacts starts near the center of the opening in the spacing member and then progresses toward the perimeter of the opening as force is increased, such that the transducer is able to measure varying pressure instead of behaving as a digital switch.

As described above, the pressure transducer of this invention is uncomplicated and can be readily mass produced, yet has been shown to be capable of the high reliability and sensitivity required for PODS and other pressure-sensing applications.

Other objects and advantages of this invention will be better appreciated from the following detailed description.

BRIEF DESCRIPTION OF DRAWINGS

FIGS. 1, 2 and 3 are plan views of a first contact member, spacing member and second contact member, respectively, for a pressure transducer in accordance with the present invention.

DETAILED DESCRIPTION

Figure 4:
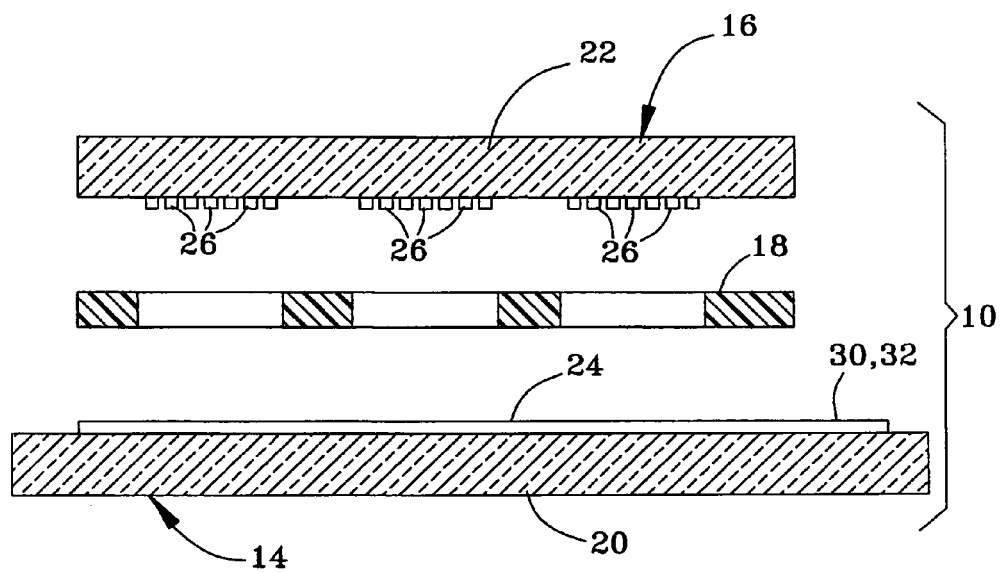
FIG. 4 is an exploded side view of the pressure transducer formed by the components of FIGS. 1 through 3.
Figure 5:
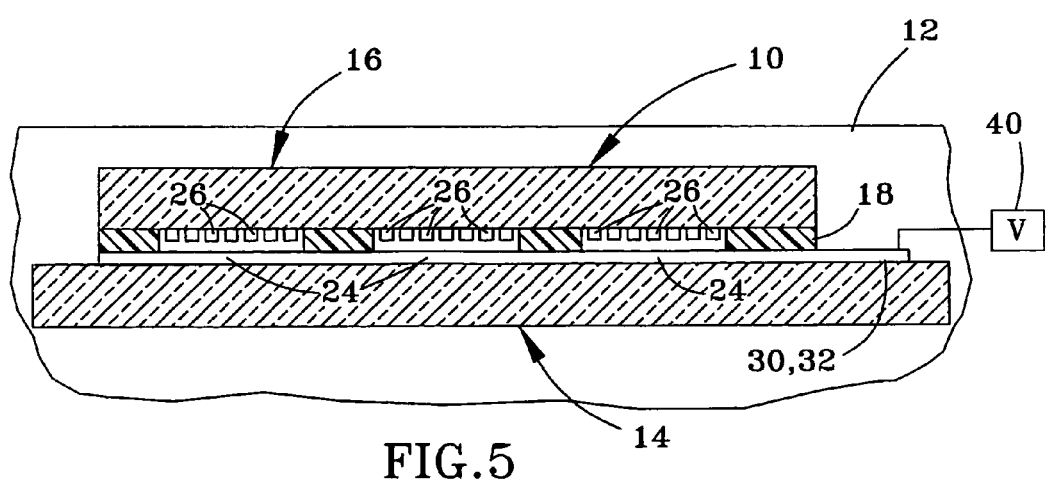
FIG. 5 is a side view of the pressure transducer installed in a seat of a passenger vehicle.

FIG. 5 represents a pressure transducer 10 located in a passenger seat cushion 12 as a component of a passive occupant detection system installed in a passenger vehicle. The transducer 10 comprises primary and secondary contact members 14 and 16 and a spacer 18 therebetween. The contact members 14 and 16 comprise substrates 20 and 22 on which primary and secondary electrical contacts 24 and 26 are defined, respectively. The substrates 20 and 22 may be formed of a variety of materials exhibiting a degree of flexibility, including various plastic materials used in electronic packages such as polyimide. As represented in FIG. 1, the contact 24 of the primary contact member 14 preferably has a serpentine configuration, so as to have multiple loops that define multiple parallel portions 28 spaced apart from each other in one (e.g., lateral) direction of the primary contact member 14. The primary contact 24 is terminated by a pair of terminations 30 and 32 located at one end 34 of the primary contact member 14, such that the primary contact 24 is continuous between the terminations 30 and 32. In contrast, the contact 26 on the secondary contact member 16 comprises a plurality of separate parallel strips 36, preferably grouped in sets as shown in FIG. 3. Preferred materials for the contacts 24 and 26 include electrically resistive materials, such as of the type used in the art to form thick-film resistors in hybrid circuit applications, though it is foreseeable that other resistive materials could be used. Furthermore, it is possible that either or both of the contacts 24 and 26 could be formed of an electrically conductive material.

The spacer 18 can be seen in FIG. 2 as having openings 38, through which the contacts 24 and 26 of the primary and secondary contact members 14 and 16 face each other, as shown in FIG. 5. The spacer 18 is preferably formed of a resilient dielectric material, such as Nylon (polyamides), Kapton (polyimides), Teflon (Polytetrafluoroethylene (PTFE)) or an equivalent material, such that the contact members 14 and 16 are spaced apart by the spacer 18 as shown in FIG. 5, but if a sufficient force is applied to the second contact member 16 (or the first contact member 14), the spacer 18 permits one or more of the strips 36 of the secondary contact 26 to come into contact with the contact 24 on the primary contact member 14. Because the strips 36 of the secondary contact 26 are oriented transverse to the parallel portions 28 of the primary contact 24, the strips 36 serve to shorten the current path between the terminations 30 and 32 of the contact 24, thus reducing the resistance of the contact 24. As more strips 36 contact the primary contact 24, the resistance of the contact 24 is further reduced. As evidenced from FIG. 5, the secondary contact member 16 and spacer 18 are shorter than the primary contact member 14, such that the end 34 of the primary contact member 14 is not covered by the contact member 16 or spacer 18, such that the terminations 30 and 34 are accessible for wire bonding, etc., to a suitable current source 40.

Figure 6:
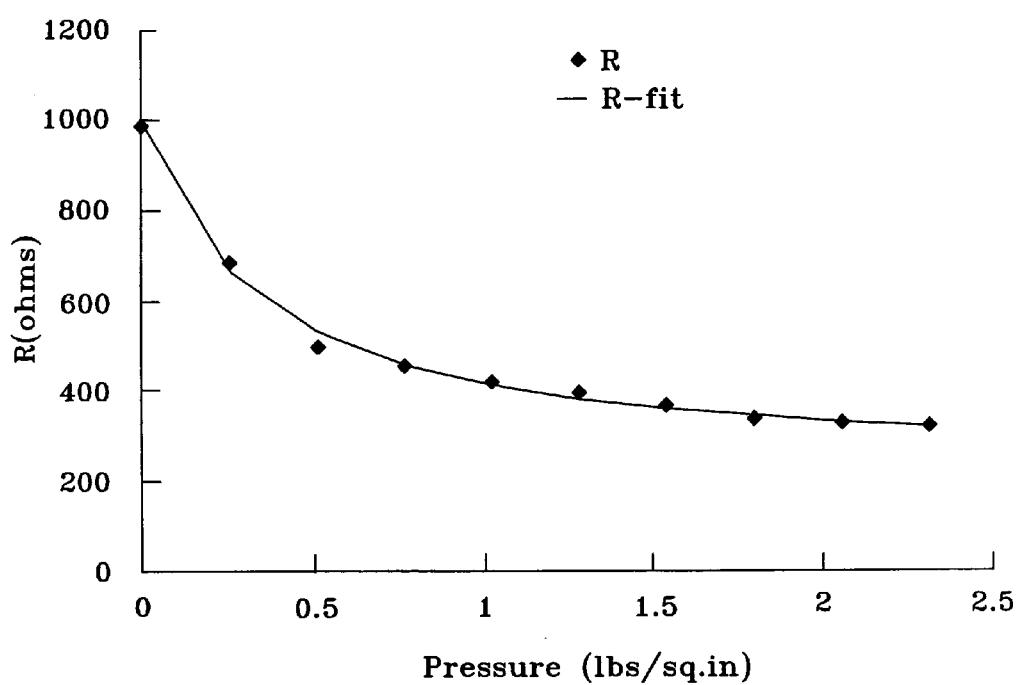
FIG. 6 is a graph representative of the output of the transducer shown in FIG. 5.

FIG. 6 represents sensor response in the form of pressure (force) versus resistance (sensor output) from tests performed with a transducer 10 configured in accordance with FIG. 5. The substrates 20 and 22 of the contact members 14 and 16 were formed of a polyimide with thicknesses on the order of about 0.25 mm, which was sufficiently thin to enable flexing of both the primary and secondary contact members 14 or 16. The primary and secondary contacts 24 and 26 were formed on their respective substrates 20 and 22 by screen printing a silver ink. The transducer 10 had approximate outer dimensions, established by the secondary contact member 16, of about 38 mm by about 27 mm. The testing that produced the data of FIG. 6 involved the placement of the transducer 10 within material representative of a passenger seat cushion. Alumina blocks weighing about 4.6 pounds (about 2.1 kg) each and having a footprint of about 3.25 by 5.5 inches (about 8.5 by 14.0 mm) were then placed on the cushion material to incrementally increase the total weight (force) applied to the transducer up to a maximum of about forty-one pounds (about 19 kg). The resistance of the transducer 10 (as measured across the terminations 30 and 32) was recorded with each incremental increase in weight.

From FIG. 6, it can be seen that the resistance (R) of the transducer 10 decreased with increasing pressure (block weight/footprint), closely fitting a curve (R-fit) having the function $C_1+PC_2+C_3/(C_4+P)$, where P is pressure and $C_1$, $C_2$, $C_3$ and $C_4$ are fit constants. Based on these results, it was concluded that transducers configured in accordance with FIG. 5 are capable of providing a reliable basis for arming and disarming an air bag based on the weight of a seat occupant.

While the invention has been described in terms of a preferred embodiment, it is apparent that other forms could be adopted by one skilled in the art. For example, various materials could be used other than those noted, the transducer 10 could differ in appearance that shown in the Figures, and the output of the transducer 10 could be based on an electrical property other than resistance. Accordingly, the scope of the invention is to be limited only by the following claims.

What is claimed is:

1. A pressure transducer comprising:
    a first contact member having on a surface thereof a primary contact comprising first and second terminations and portions spaced apart in a first direction, the portions defining a continuous electrical path between the first and second terminations;
    a spacing member facing the surface of the first contact member, the spacing member having at least one opening aligned with the spaced-apart portions of the primary contact; and
    a second contact member separated from the first contact member by the spacing member, the second contact member having on a surface thereof a plurality of secondary contacts oriented so as to face and cross multiple spaced-apart portions of the primary contact through the at least one opening in the spacing member;
    wherein application of an increasing force urges the first and second contact members toward each other and causes an increasing number of the spaced-apart portions to be contacted by an increasing number of the secondary contacts and thereby alter the electrical path between the first and second terminations.

2. The pressure transducer according to claim 1, wherein the primary contact is formed of an electrically resistive material.

3. The pressure transducer according to claim 1, wherein the secondary contacts are formed of an electrically resistive material.

4. The pressure transducer according to claim 1, wherein the continuous and secondary contacts are formed of electrically resistive materials.

5. The pressure transducer according to claim 1, wherein the secondary contacts are electrically separated from each other on the second contact member.

6. The pressure transducer according to claim 5, wherein the secondary contacts are oriented parallel to each other.

7. The pressure transducer according to claim 6, wherein the secondary contacts are parallel to the first direction.

8. The pressure transducer according to claim 6, wherein the spaced-apart portions of the primary contact are oriented parallel to each other in a direction perpendicular to the first direction.

9. The pressure transducer according to claim 1, wherein the spacing member is formed of a dielectric material.

10. The pressure transducer according to claim 1, wherein the primary contact has a serpentine shape and the spaced-apart portions of the primary contact are physically parallel to each other.

11. The pressure transducer according to claim 1, wherein the at least one opening in the spacing member comprises multiple openings and the plurality of secondary contacts are arranged in multiple sets, each set of the secondary contacts facing the spaced-apart portions of the primary contact through a corresponding one of the multiple openings in the spacing member.

12. The pressure transducer according to claim 1, wherein the pressure transducer is installed in a seat cushion of a passenger vehicle.

13. The pressure transducer according to claim 1, wherein the pressure transducer is a component of a passive occupant detection system installed in a passenger vehicle.

14. A pressure transducer comprising:
- a first contact member having on a surface thereof a primary contact formed of an electrically resistive material, the primary contact comprising first and second terminations between which current is able to flow through the primary contact, the primary contact further comprising parallel portions spaced apart in a first direction;
- a spacing member facing the surface of the first contact member, the spacing member having at least one opening aligned with the parallel portions of the primary contact;
- a second contact member separated from the first contact member by the spacing member, the second contact member having on a surface thereof a plurality of parallel contacts formed of an electrically resistive material, the parallel contacts being oriented in the first direction and facing the parallel portions of the primary contact through the at least one opening in the spacing member; and
- means for flowing current through the primary contact between the first and second terminations thereof;
- wherein application of an increasing force urges the first and second contact members toward each other and causes an increasing number of the parallel portions of the primary contact to be contacted by an increasing number of the parallel contacts of the secondary contact and thereby alter the current path between the first and second terminations, and wherein the electrical resistance of the current path decreases as the force increases.

15. The pressure transducer according to claim 14, wherein the primary contact has a serpentine shape.

16. The pressure transducer according to claim 14, wherein the spacing member is formed of a dielectric material.

17. The pressure transducer according to claim 14, wherein the at least one opening in the spacing member comprises multiple openings and the plurality of parallel contacts are arranged in multiple sets, each set of the parallel contacts facing the parallel portions of the primary contact through a corresponding one of the multiple openings in the spacing member.

18. The pressure transducer according to claim 14, wherein as the increasing force is applied, contact between the parallel portions of the primary contact and the parallel contacts of the secondary contact starts near the center of the at least one opening and then progresses toward the perimeter of the opening.

19. The pressure transducer according to claim 14, wherein the pressure transducer is installed in a seat cushion of a passenger vehicle.

20. The pressure transducer according to claim 14, wherein the pressure transducer is a component of a passive occupant detection system installed in a passenger vehicle.

* * * * *